United States Patent
Chishima et al.

(10) Patent No.: US 9,225,178 B2
(45) Date of Patent: Dec. 29, 2015

(54) CHARGING APPARATUS

(75) Inventors: Yuki Chishima, Kawasaki (JP); Kunihisa Nakao, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 13/365,127

(22) Filed: Feb. 2, 2012

(65) Prior Publication Data
US 2012/0200251 A1    Aug. 9, 2012

(30) Foreign Application Priority Data

Feb. 7, 2011   (JP) ................... 2011-023667

(51) Int. Cl.
    *H02J 7/00*   (2006.01)
    *H02J 7/04*   (2006.01)

(52) U.S. Cl.
    CPC .............. *H02J 7/0004* (2013.01); *H02J 7/045* (2013.01)

(58) Field of Classification Search
    CPC ............................... H02J 7/0004; H02J 7/045
    USPC ........................................ 320/107, 162, 165
    See application file for complete search history.

(56) References Cited

U.S. PATENT DOCUMENTS

| | | | |
|---|---|---|---|
| 2001/0017531 A1* | 8/2001 | Sakakibara et al. | 320/106 |
| 2007/0108940 A1* | 5/2007 | Sainomoto et al. | 320/112 |
| 2010/0270973 A1* | 10/2010 | Miyazaki et al. | 320/120 |

FOREIGN PATENT DOCUMENTS

| | | |
|---|---|---|
| JP | 2005-020822 A | 1/2005 |
| JP | 2005-073498 A | 3/2005 |
| JP | 2005-151683 A | 6/2005 |
| JP | 2009-177930 A | 8/2009 |
| JP | 2009-272134 A | 11/2009 |
| JP | 2011-015591 A | 1/2011 |

* cited by examiner

*Primary Examiner* — Richard Isla Rodas
*Assistant Examiner* — Nathaniel Pelton
(74) *Attorney, Agent, or Firm* — Canon U.S.A., Inc., IP Division

(57) ABSTRACT

A charging apparatus capable of charging a battery device includes a communication terminal configured to receive a signal for controlling charging of the battery device from the battery device, a detection unit configured to detect a voltage level of an input signal which is input in the charging apparatus via the communication terminal, a signal switching unit configured to connect between the communication terminal and the detection unit and change the voltage level of the input signal, and a charging control unit configured to control charging of the battery device based on the voltage level of the input signal changed by controlling the signal switching unit.

17 Claims, 8 Drawing Sheets

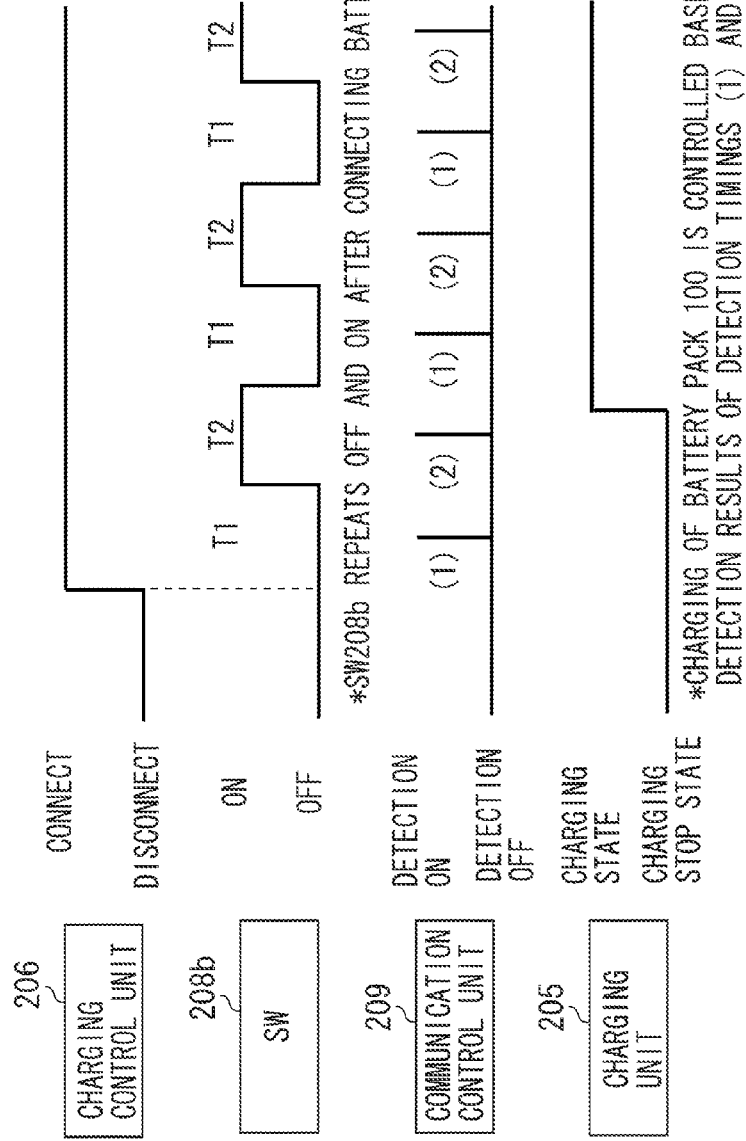

FIG. 3

| | SW208b OFF | SW208b ON | STATES OF BATTERY CELLS 107a AND 107b | OPERATION OF CHARGING APPARATUS 200 |
|---|---|---|---|---|
| Case A | LOW | LOW | VOLTAGE OF AT LEAST ONE OF BATTERY CELLS 107a AND 107b IS EQUAL TO OR MORE THAN VOLTAGE Vp | CHARGING STOP STATE: CHARGING UNIT 205 CONTINUES TO STOP CHARGING OF BATTERY PACK 100. CHARGING STATE: CHARGING UNIT 205 STOPS CHARGING OF BATTERY PACK 100 |
| Case B | LOW | HIGH | VOLTAGES OF ALL BATTERY CELLS 107a AND 107b ARE LESS THAN VOLTAGE Vp | CHARGING STOP STATE: CHARGING UNIT 205 STARTS CHARGING OF BATTERY PACK 100 CHARGING STATE: CHARGING UNIT 205 CONTINUES TO CHARGE BATTERY PACK 100. |
| Case C | LOW | LOW | NOT CONSIDERED | CHARGING APPARATUS 200 NOTIFY USER THAT BATTERY PACK 100 IS ABNORMAL BATTERY. THE BATTERY PACK 100 IS NOT CHARGED. |
| Case D | HIGH | HIGH | NOT CONSIDERED | CHARGING APPARATUS 200 NOTIFY USER OF LOOSE CONNECTION. THE BATTERY PACK 100 IS NOT CHARGED. |

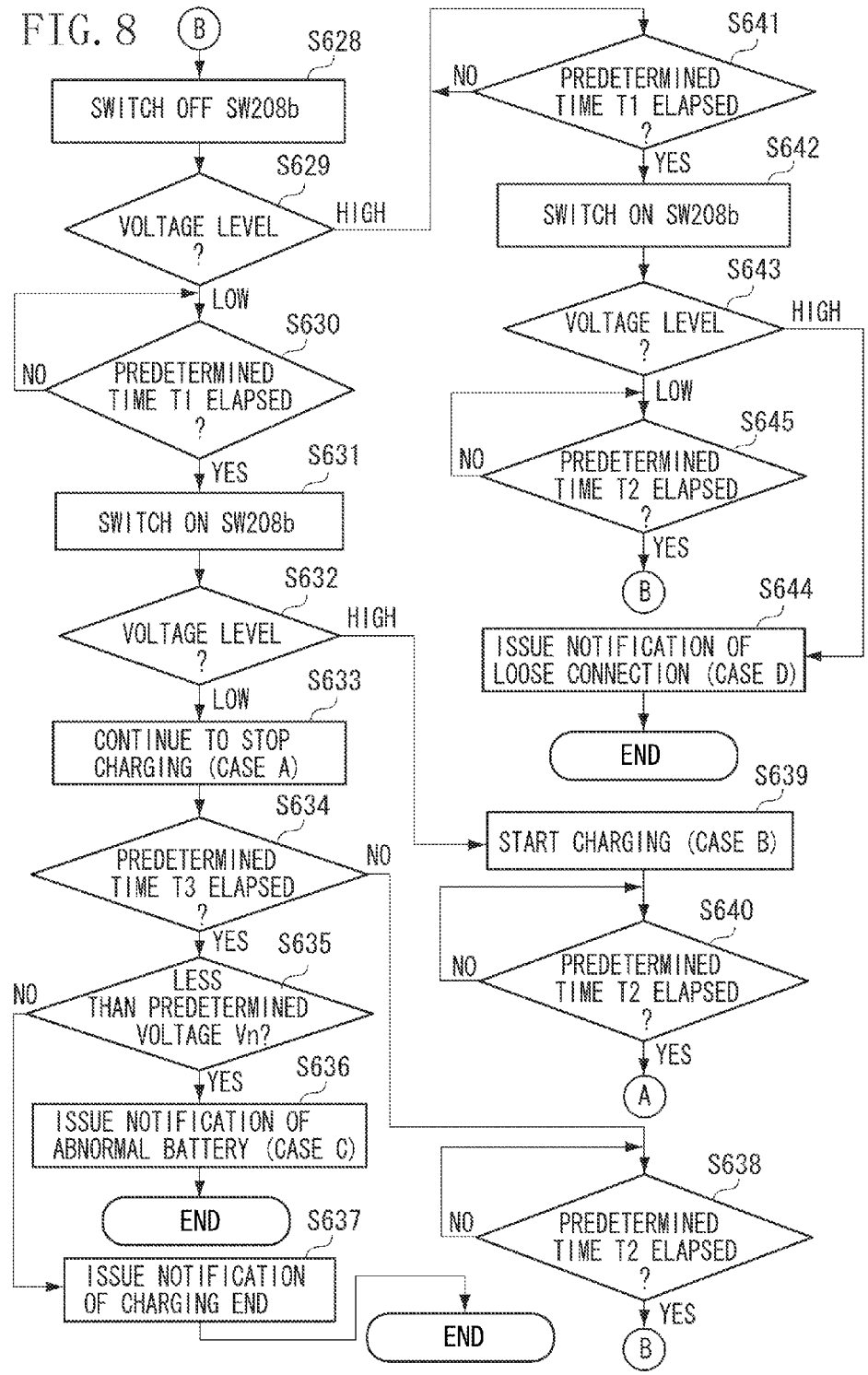

CHARGING APPARATUS

BACKGROUND OF THE INVENTION

1. Field of the Invention

The present invention relates to a charging apparatus that charges a battery device (battery pack).

2. Description of the Related Art

There is a battery device used for a camera apparatus which includes two or more battery cells. A battery pack formed by serially connecting two or more lithium ion batteries may be one of the battery device including two or more battery cells. A charging apparatus that charges such a battery device includes an overcharge preventing function to prevent the overcharge thereof. A function of stopping the charging of the battery device when a charging voltage to the battery device exceeds a predetermined voltage or more is one of the overcharge preventing functions. Japanese Patent Application Laid-Open No. 2009-177930 discusses an overcharge preventing function for solving an issue of determining by a charging apparatus that a battery device is not connected to the charging apparatus though the battery device is connected to the charging apparatus and supplying a constant voltage from the charging apparatus to the battery device.

The charging apparatus that charges the battery device including two or more battery cells needs various overcharge preventing functions. For example, when the battery device can communicate with the charging apparatus, an overcharge preventing function is advantageous for controlling the charging of the battery device according to as whether loose connection occurs between a communication terminal of the battery device and that of the charging apparatus. Also when the battery device can communicate with the charging apparatus, an overcharge preventing function is advantageous for controlling the charging of the battery device according to as whether a communication line is short-circuited between the battery device and the charging apparatus.

SUMMARY OF THE INVENTION

One aspect of the present invention is directed to proper control of charging of a battery device even if loose connection occurs between a communication terminal of the battery device and that of a charging apparatus.

Another aspect of the present invention is directed to proper control of charging of a battery device even if a communication line is short-circuited between the battery device and a charging apparatus.

Yet another aspect of the present invention, there is provided a charging apparatus capable of charging a battery device. The charging apparatus includes a communication terminal configured to receive a signal for controlling charging of the battery device from the battery device, a detection unit configured to detect a voltage level of an input signal which is input in the charging apparatus via the communication terminal, a signal switching unit configured to connect between the communication terminal and the detection unit and change the voltage level of the input signal, and a charging control unit configured to control charging of the battery device based on the voltage level of the input signal changed by controlling the signal switching unit.

Yet another aspect of the present invention, there is provided a method for controlling a charging apparatus capable of charging a battery device. The method includes controlling a communication terminal of the charging apparatus to receive a signal for controlling charging of the battery device from the battery device, controlling a detection unit of the charging apparatus to detect a voltage level of an input signal which is input in the charging apparatus via the communication terminal, controlling a signal switching unit connected between the communication terminal and the detection unit to change the voltage level of the input signal, and controlling charging of the battery device based on the voltage level of the input signal changed by controlling the signal switching unit.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 2 is a timing chart illustrating operations of a charging control unit, a switch (SW), a communication control unit, and a charging unit.

FIG. 3 illustrates operations of the charging apparatus.

FIG. 5 illustrates a voltage level of an input signal from the communication line if the battery protection unit outputs the charging start signal (at the inconstant voltage level) and the SW is ON.

FIG. 8 is a flowchart illustrating other operations of the battery pack and the charging apparatus according to the first exemplary embodiment.

DESCRIPTION OF THE EMBODIMENTS

Various exemplary embodiments, features, and aspects of the present invention will be described in detail below with reference to the drawings.

First Exemplary Embodiment

Figure 1:
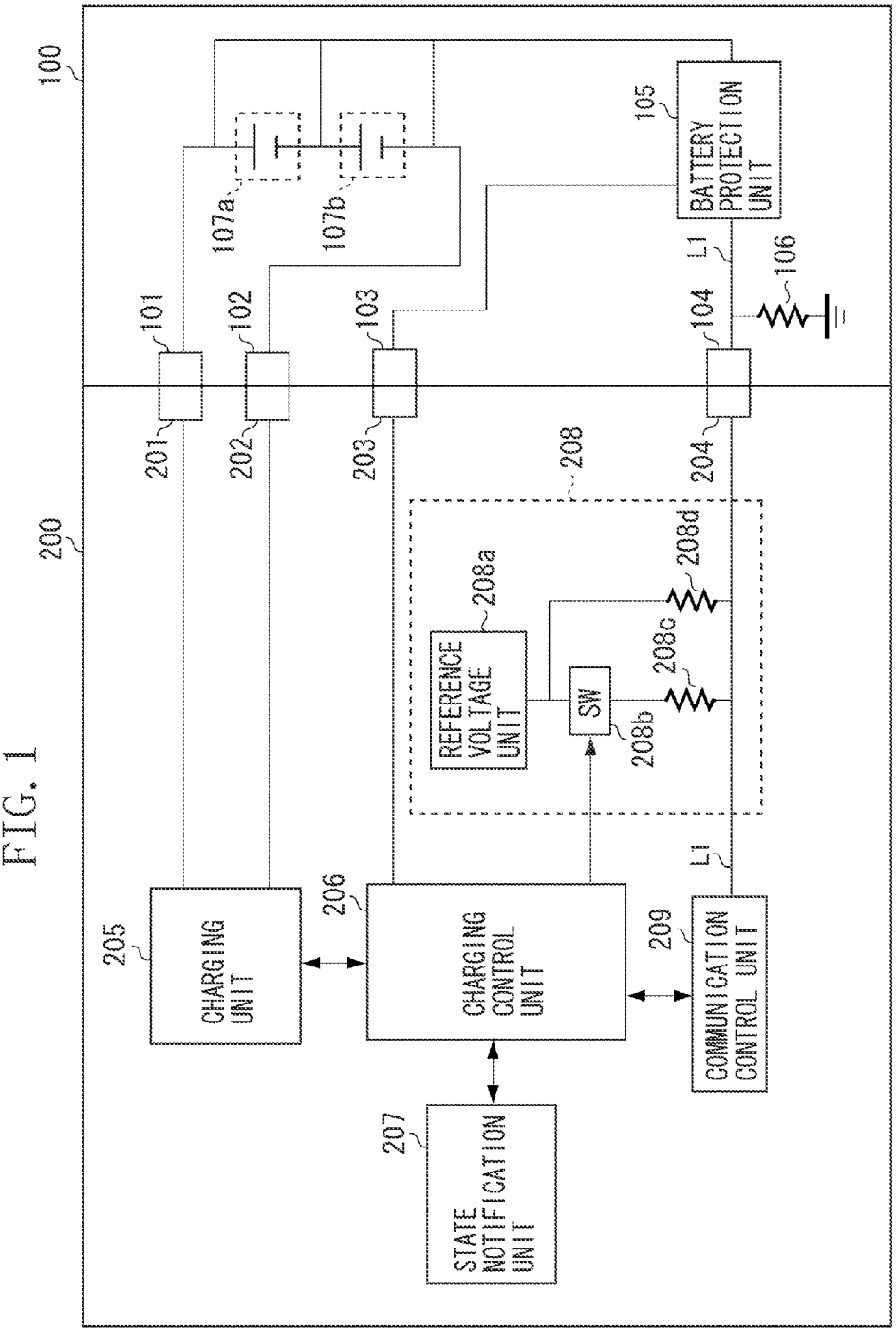
FIG. 1 is a block diagram illustrating components in a battery pack and a charging apparatus according to a first exemplary embodiment of the present invention.

FIG. 1 is a block diagram illustrating components in a battery pack 100 and a charging apparatus 200 according to a first exemplary embodiment of the present invention.

The battery pack 100 is a battery device including two or more battery cells. According to the first exemplary embodiment, the battery pack 100 including two battery cells 107*a* and 107*b* is described as an example. The battery cells 107*a* and 107*b* are, e.g., lithium ion batteries. Referring to FIG. 1, the battery cells 107*a* and 107*b* are serially connected.

The battery pack 100 further includes a positive terminal 101, a negative terminal 102, a connection detection terminal 103, a communication terminal 104, a battery protection unit 105, and a pull-down (PD) circuit 106. The PD circuit 106 includes a resistance R1.

When the battery pack 100 is connected to an external device X, the battery pack 100 can supply power to the external device X via the positive terminal 101 and the negative terminal 102. The external device X is, e.g., a camera device, a video camera device, or a mobile terminal. When the battery pack 100 is connected to the charging apparatus 200, the battery pack 100 can receive power from the charging apparatus 200 via the positive terminal 101 and the negative terminal 102.

The connection detection terminal 103 determines whether or not the battery pack 100 is connected to the charging apparatus 200. The connection detection terminal 103 also determines whether or not the battery pack 100 is connected to the external device X.

The communication terminal 104 transmits a charging control signal generated by the battery protection unit 105 to the charging apparatus 200. The charging control signal is a signal for controlling the charging of the battery pack 100 by the charging apparatus 200. The communication terminal 104 can be used to transmit information about the battery pack 100 to the charging apparatus 200. The information about the battery pack 100 is managed by the battery protection unit 105. When the communication terminal 104 of the battery pack 100 is connected to a communication terminal 204 of the charging apparatus 200, a communication line L1 is formed.

The battery protection unit 105 includes a central processing unit (CPU) or a micro processing unit (MPU) to control an operation of the battery pack 100 thereby. The battery protection unit 105 includes a memory for managing the information about the battery pack 100. The battery protection unit 105 can communicate with a communication control unit 209 in the charging apparatus 200 via the communication terminal 104 and the communication terminal 204.

When a voltage of at least one of the two battery cells 107a and 107b is equal to or more than a predetermined voltage Vp, the battery protection unit 105 transmits a charging stop signal C1 as a charging control signal to the charging apparatus 200. The predetermined voltage Vp is a voltage for protecting the battery cells 107a and 107b, and is determined according to the type and capacity of the battery cells 107a and 107b. The predetermined voltage Vp is, for example, 4.25 V. The predetermined voltage Vp is also referred to as a charging stop voltage Vp.

The charging stop signal C1 is a charging control signal for instructing the charging apparatus 200 to stop the charging of the battery pack 100. According to the first exemplary embodiment, a voltage level of the charging stop signal C1 is regarded as a ground (GND) level. The charging stop signal C1 transmitted from the battery protection unit 105 is input to the communication control unit 209 via the communication line L1.

When the voltages of all of the two battery cells 107a and 107b are less than the predetermined voltage Vp, the battery protection unit 105 transmits a charging start signal C2 as a charging control signal to the charging apparatus 200.

The charging start signal C2 is a charging control signal for instructing the charging apparatus 200 to start charging the battery pack 100. According to the first exemplary embodiment, a voltage level of the charging start signal C2 is an inconstant voltage level that is not fixed to a constant level. The charging start signal C2 transmitted from the battery protection unit 105 is input to the communication control unit 209 via the communication line L1.

As illustrated in FIG. 1, the charging apparatus 200 includes a positive terminal 201, a negative terminal 202, a connection detection terminal 203, the communication terminal 204, a charging unit 205, a charging control unit 206, a state notification unit 207, a signal switching unit 208, and the communication control unit 209.

When the battery pack 100 is connected to the charging apparatus 200, the positive terminal 201 is connected to the positive terminal 101, the negative terminal 202 is connected to the negative terminal 102, the connection detection terminal 203 is connected to the connection detection terminal 103, and the communication terminal 204 is connected to the communication terminal 104.

The charging unit 205 can charge the battery pack 100 via the positive terminal 201 and the negative terminal 202.

The state notification unit 207 includes at least one of a display device, a speaker, and a light emitting diode (LED). The state notification unit 207 can notify a user of a state of the charging apparatus 200 with use of at least one of a message, light, and sound.

The charging control unit 206 includes a central processing unit (CPU) or a micro processing unit (MPU), and controls an operation of the charging apparatus 200 thereby. The charging control unit 206 controls operations of the charging unit 205, the state notification unit 207, the signal switching unit 208, and the communication control unit 209. The charging control unit 206 includes a memory for storing the information about the battery pack 100.

The communication control unit 209 can communicate with the battery protection unit 105 of the battery pack 100 via the communication terminal 104 and the communication terminal 204. The communication control unit 209 receives a charging control signal transmitted from the battery protection unit 105, and supplies the received charging control signal to the charging control unit 206. The communication control unit 209 acts as a detection unit for detecting a voltage level of the input signal from the communication line L1. The voltage level detected by the communication control unit 209 is notified to the charging control unit 206.

The signal switching unit 208 is used for determining whether or not loose connection occurs between the communication terminal 204 and the communication terminal 104. Furthermore, the signal switching unit 208 is used for determining whether or not the communication line L1 is short-circuited. The signal switching unit 208 is connected between the communication terminal 204 and the communication control unit 209. The signal switching unit 208 changes the voltage level of the input signal which is input from the communication line L1 to the communication control unit 209 in response to an instruction from the charging control unit 206.

Referring to FIG. 1, the signal switching unit 208 includes a reference voltage unit 208a, a switch (SW) 208b, a pull-up (PU) circuit 208c, and a pull-up (PU) circuit 208d. The PU circuit 208c includes a resistance R2, and the PU circuit 208d includes a resistance R3.

The reference voltage unit 208a generates a reference voltage Vr. The reference voltage Vr generated by the reference voltage unit 208 is supplied to the SW 208b and the PU circuit 208c.

The charging control unit 206 controls the SW 208b. The SW 208b is controlled by the charging control unit 206, and the signal switching unit 208 thus changes the voltage level of the input signal input from the communication line L1 to the communication control unit 209. A control method of the SW 208b by the charging control unit 206 is described with reference to FIG. 2.

The resistance R3 of the PU circuit 208d is much higher than the resistance R2 of the PU circuit 208c. Furthermore, the resistance R3 of the PU circuit 208d is much higher than the resistance R1 of the PD circuit 106.

FIG. 2 is a timing chart illustrating operations of the charging control unit 206, the SW 208b, the communication control unit 209, and the charging unit 205.

If the connection detection terminal 103 is not connected to the connection detection terminal 203, a signal input from the connection detection terminal 203 to the charging control unit 206 is at a low level. If the signal input from the connection detection terminal 203 to the charging control unit 206 is at the low level, the charging control unit 206 determines that the battery pack 100 is not connected to the charging apparatus 200.

If the battery pack 100 is connected to the charging apparatus 200 and the connection detection terminal 103 is connected to the connection detection terminal 203, the signal input from the connection detection terminal 203 to the charging control unit 206 changes from the low level to a high level. If the signal input from the connection detection terminal 203 to the charging control unit 206 is at the high level, the charging control unit 206 determines that the battery pack 100 is connected to the charging apparatus 200. As a consequence, the charging control unit 206 can determine whether or not the battery pack 100 is connected to the charging apparatus 200.

While the battery pack 100 is connected to the charging apparatus 200, the charging control unit 206 controls the SW 208b so that the SW 208b being off and the SW 208b being on are repeatedly performed. According to the first exemplary embodiment, a predetermined time T1 is a period of time during which SW 208b is OFF, and a predetermined time T2 is a period of time during which SW 208b is ON. The predetermined time T1 is, for example, 0.5 second. The predetermined time T2 may be the same as the predetermined time T1 or may be different from the predetermined time T1.

The communication control unit 209 detects the voltage level of the input signal from the communication line L1 within the predetermined time T1 (refer to a detection timing (1) in FIG. 2). The voltage level detected by the communication control unit 209 within the predetermined time T1 is notified from the communication control unit 209 to the charging control unit 206.

The communication control unit 209 detects the voltage level of the input signal from the communication line L1 within the predetermined time T2 (refer to a detection timing (2) in FIG. 2). The voltage level detected by the communication control unit 209 within the predetermined time T2 is notified from the communication control unit 209 to the charging control unit 206.

The charging control unit 206 controls the charging unit 205 based on the voltage level of the input signal detected within the predetermined time T1 and the voltage level of the input signal detected within the predetermined time T2. A control method of the charging unit 205 by the charging control unit 206 is described below with reference to FIGS. 3, 6, 7, and 8.

FIG. 3 illustrates operations of the charging apparatus 200. In a case A, the battery pack 100 is normally connected to the charging apparatus 200, and a voltage of at least one of the battery cells 107a and 107b in the battery pack 100 is equal to or more than the predetermined voltage Vp.

In the case A, since a voltage of at least one of the battery cells 107a and 107b is equal to or more than the predetermined voltage Vp, the battery protection unit 105 outputs the charging stop signal C1. The voltage level of the charging stop signal C1 is the GND level. Therefore, the voltage level of the input signal from the communication line L1, which is detected by the communication control unit 209 within the predetermined time T1, is the low level. Furthermore, in the case A, the voltage level of the input signal from the communication line L1, which is detected by the communication control unit 209 within the predetermined time T2, is also the low level.

When the low level is detected in both of the predetermined times T1 and T2, the charging control unit 206 determines that a state of the battery pack 100 corresponds to the case A.

If the charging control unit 206 determines that the state of the battery pack 100 corresponds to the case A when the charging unit 205 has stopped charging the battery pack 100, the charging control unit 206 instructs the charging unit 205 to continue to stop charging. Upon receiving the instruction, the charging unit 205 continues to stop charging the battery pack 100 (refer to step S610 in FIG. 6 and step S633 in FIG. 8).

If the charging control unit 206 determines that the state of the battery pack 100 corresponds to the case A when the charging unit 205 is charging the battery pack 100, the charging control unit 206 instructs the charging unit 205 to stop charging. Upon receiving the instruction, the charging unit 205 stops charging the battery pack 100 (refer to step S621 in FIG. 7). As a consequence, it is possible to prevent the overcharge of the battery cell at the predetermined voltage Vp or more.

In a case B, the battery pack 100 is normally connected to the charging apparatus 200, and voltages of all of the battery cells 107a and 107b in the battery pack 100 are less than the predetermined voltage Vp.

In the case B, since voltages of all of the battery cells 107a and 107b are less than the predetermined voltage Vp, the battery protection unit 105 outputs the charging start signal C2. The voltage level of the charging start signal C2 is the inconstant voltage level. Therefore, the voltage level of the input signal from the communication line L1, which is detected by the communication control unit 209 within the predetermined time T1, is the low level (refer to FIG. 4). Furthermore, in the case B, the voltage level of the input signal from the communication line L1, which is detected by the communication control unit 209 within the predetermined time T2, is the high level (refer to FIG. 5).

When the low level is detected within the predetermined time T1 and the high level is detected within the predetermined time T2, the charging control unit 206 determines that the state of the battery pack 100 corresponds to the case B.

If the charging control unit 206 determines that the state of the battery pack 100 corresponds to the case B when the charging unit 205 has stopped charging the battery pack 100, the charging control unit 206 instructs the charging unit 205 to start charging. Upon receiving the instruction, the charging unit 205 starts charging the battery pack 100 (refer to step S608 in FIG. 6 and step S639 in FIG. 8).

If the charging control unit 206 determines that the state of the battery pack 100 corresponds to the case B when the charging unit 205 is charging the battery pack 100, the charging control unit 206 instructs the charging unit 205 to continue the charging. Upon receiving the instruction, the charging unit 205 continues the charging of the battery pack 100 (refer to step S617 in FIG. 7).

In a case C, the battery pack 100 is connected to the charging apparatus 200 and the communication line L1 is however short-circuited. In the case C, it is not considered that whether or not a voltage of at least one of the battery cells 107a and 107b in the battery pack 100 is equal to or more than the predetermined voltage Vp.

In the case C, the communication line L1 is short-circuited. Therefore, the voltage level of the input signal from the communication line L1, which is detected by the communication control unit 209 within the predetermined time T1, is the low level. Furthermore, in the case C, the voltage level of the input signal from the communication line L1, which is detected by the communication control unit 209 within the predetermined time T2, is also the low level.

If the low level is continuously detected in both the predetermined times T1 and T2 before a predetermined time T3 is elapsed and after the charging of the battery pack 100 is stopped in the case A, the charging control unit 206 determines that the state of the battery pack 100 corresponds to the case C. In this case, the charging control unit 206 instructs the state notification unit 207 to perform a notification of an abnormal battery (refer to step S636 in FIG. 8). Furthermore, in this case, the charging apparatus 200 does not charge the battery pack 100. As a consequence, the charging apparatus 200 can properly control the charging of the battery pack 100.

In a case D, the battery pack 100 is connected to the charging apparatus 200, and the loose connection however occurs between the communication terminal 204 and the communication terminal 104. When the communication terminal 204 is not normally connected to the communication terminal 104 by some reason, the loose connection occurs between the communication terminal 204 and the communication terminal 104. In the case D, it is not considered that a voltage of at least one of the battery cells 107a and 107b in the battery pack 100 is equal to or more than the predetermined voltage Vp.

In the case D, the loose connection occurs between the communication terminal 204 and the communication terminal 104. Therefore, the voltage level of the input signal from the communication line L1, which is detected by the communication control unit 209 within the predetermined time T1, is the high level. Furthermore, in the case D, the voltage level of the input signal from the communication line L1, which is detected by the communication control unit 209 within the predetermined time T2, is also at the high level.

When the voltage level of the input signal from the communication line L1, which is detected within the predetermined time T1 immediately after that the battery pack 100 is connected to the charging apparatus 200, is the high level, the charging control unit 206 determines that the state of the battery pack 100 corresponds to the case D. In this case, the charging control unit 206 instructs the state notification unit 207 to perform a notification of the loose connection (refer to step S604 in FIG. 6). Furthermore, in this case, the charging apparatus 200 does not charge the battery pack 100.

If the low level is detected within the predetermined time T1 immediately after connecting the battery pack 100 to the charging apparatus 200 and then the high level is detected within both the predetermined times T1 and T2, the charging control unit 206 determines that the state of the battery pack 100 corresponds to the case D. In this case, the charging control unit 206 instructs the state notification unit 207 to perform a notification of the loose connection (refer to step S626 in FIG. 7 and step S644 in FIG. 8). In this case, the charging apparatus 200 does not charge the battery pack 100.

Figure 4:
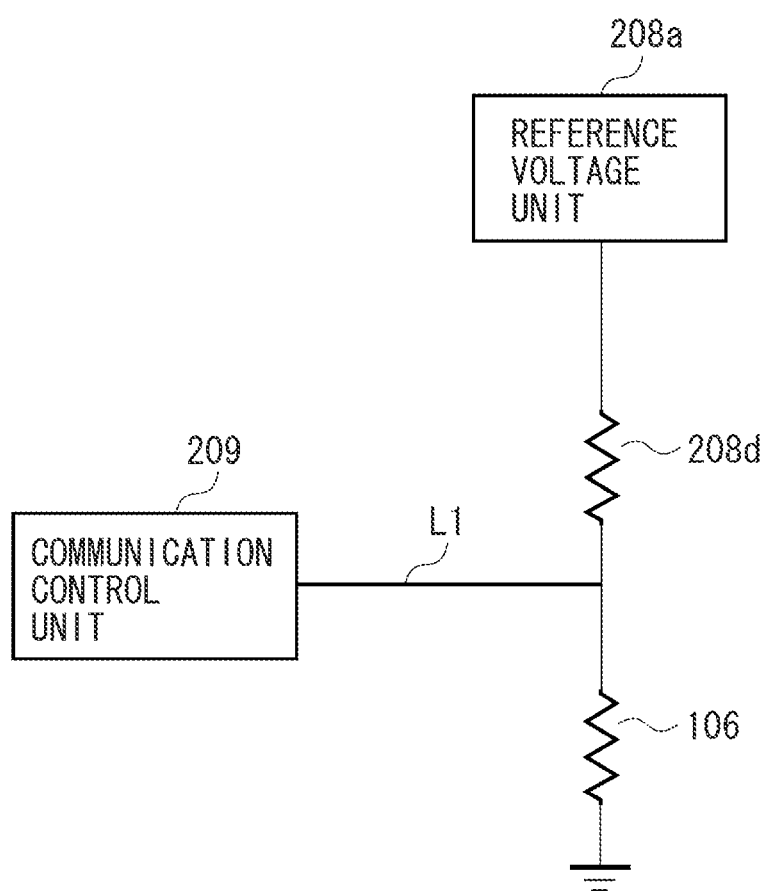
FIG. 4 illustrates a voltage level of an input signal from a communication line if a battery protection unit outputs a charging start signal (at an inconstant voltage level) and the SW is OFF.

FIG. 4 illustrates the voltage level of the input signal from the communication line L1 if the battery protection unit 105 outputs the charging start signal C2 (at the inconstant voltage level) and the SW 208b is OFF.

If the battery protection unit 105 outputs the charging start signal C2 (at the inconstant voltage level) and the SW 208b is OFF, the reference voltage Vr is divided by the PU circuit 208d and the PD circuit 106. The resistance R3 of the PU circuit 208d is much higher than the resistance R1 of the PD circuit 106. Therefore, the voltage level of the input signal from the communication line L1 is the low level.

Figure 5:
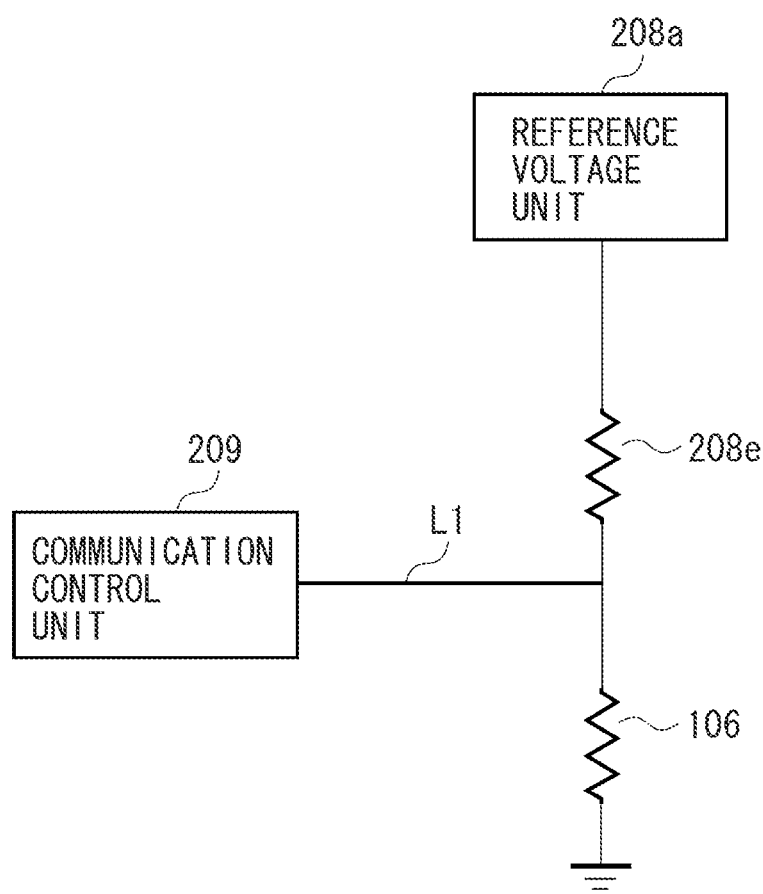

FIG. 5 illustrates the voltage level of the input signal from the communication line L1 if the battery protection unit 105 outputs the charging start signal C2 (at the inconstant voltage level) and the SW 208b is ON. Referring to FIG. 5, a resistance 208e is a combined resistance of the PU circuit 208c and the PU circuit 208d.

If the battery protection unit 105 outputs the charging start signal C2 (at the inconstant voltage level) and the SW 208b is ON, the reference voltage Vr is divided by the combined resistance 208e and the PD circuit 106. The resistance R3 of the PU circuit 208d is much higher than the resistance R2 of the PU circuit 208c and is also much higher than the resistance R1 of the PD circuit 106. Therefore, the voltage level of the input signal from the communication line L1 is the high level.

Figure 6:
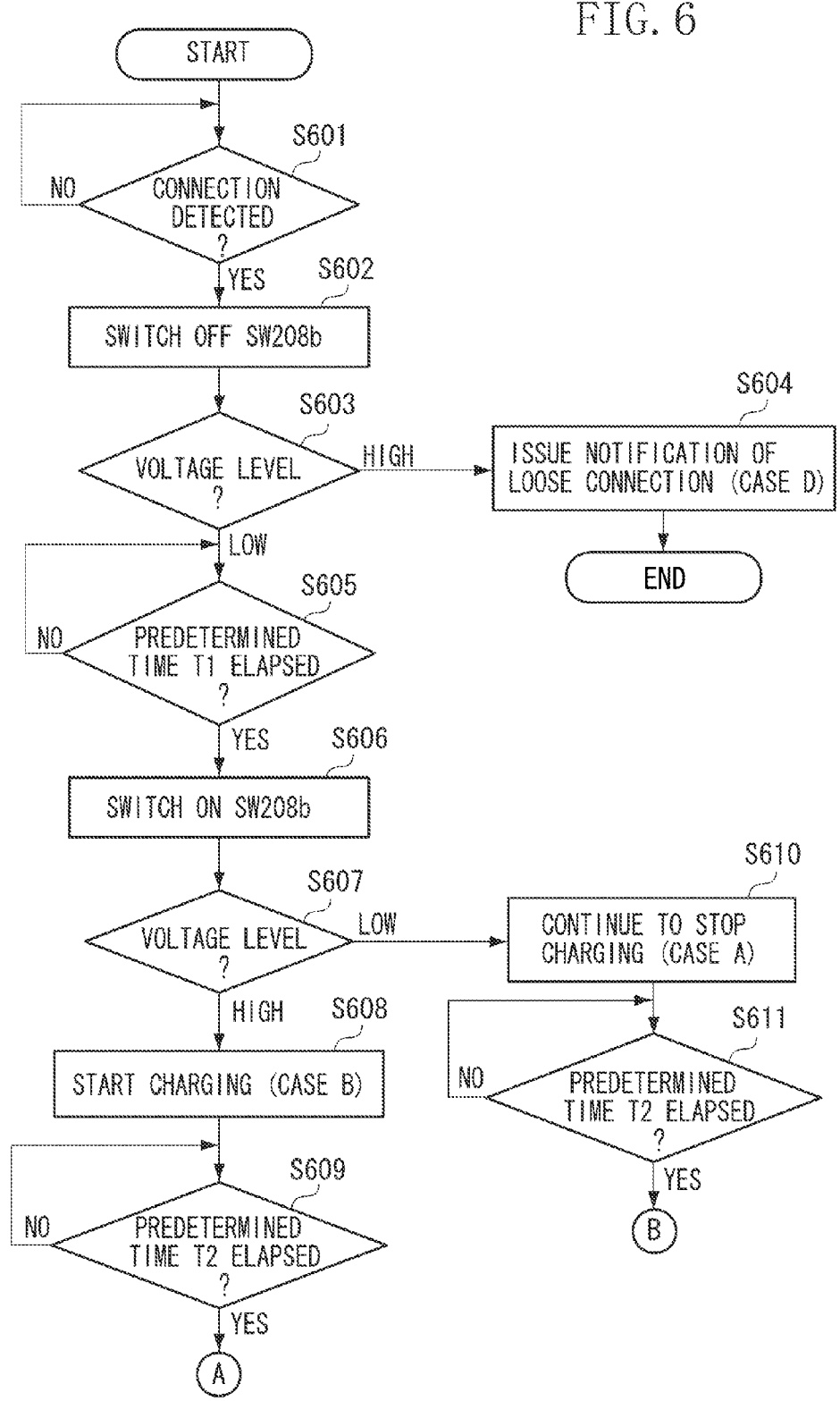
FIG. 6 is a flowchart illustrating operations of the battery pack and the charging apparatus according to the first exemplary embodiment.
Figure 7:
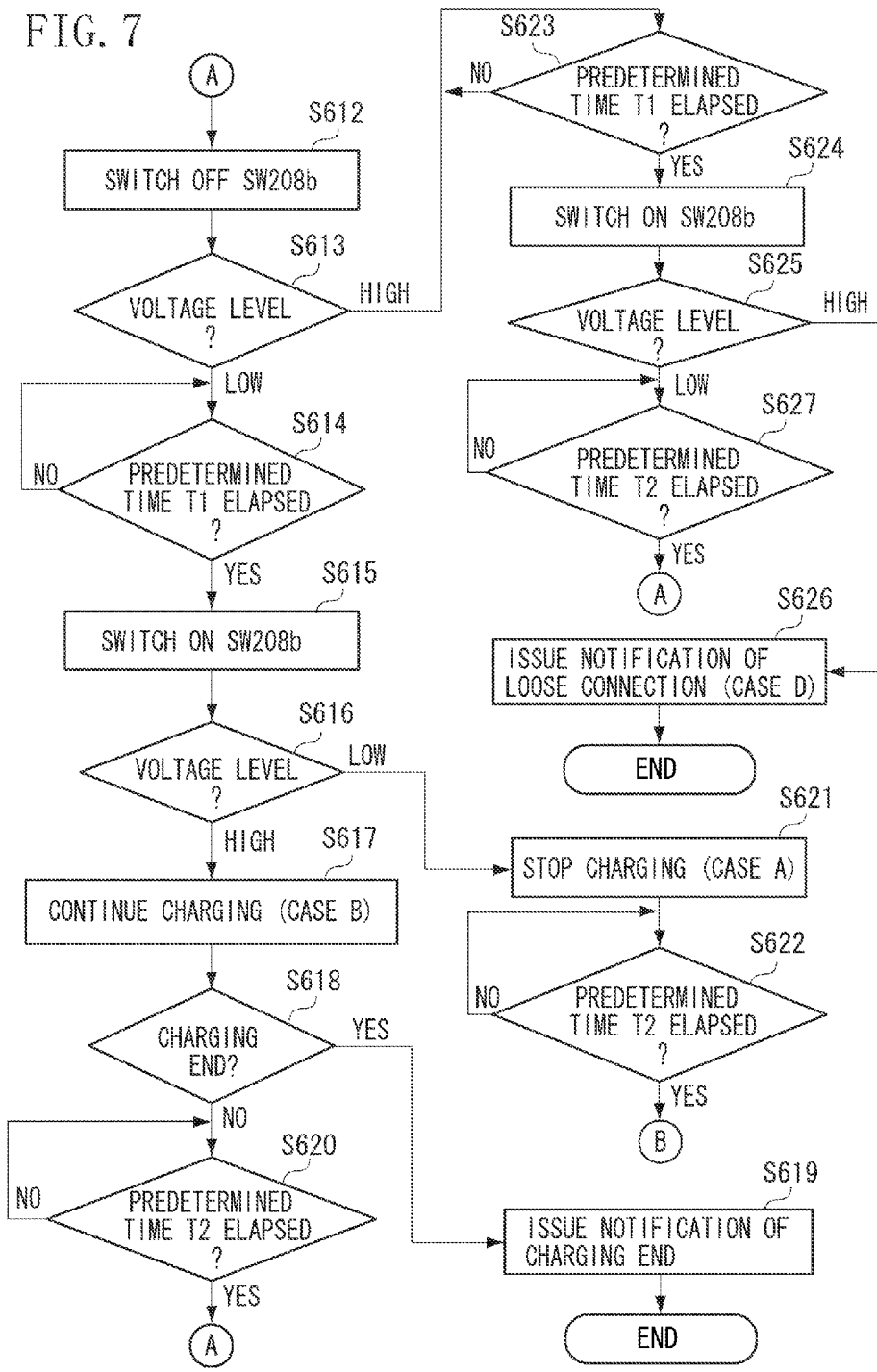
FIG. 7 is a flowchart illustrating other operations of the battery pack and the charging apparatus according to the first exemplary embodiment.

FIGS. 6, 7, and 8 are flowcharts illustrating operations of the battery pack 100 and the charging apparatus 200 according to the first exemplary embodiment of the present invention.

In step S601, the charging control unit 206 determines whether or not the battery pack 100 is connected to the charging apparatus 200.

If the connection detection terminal 103 is connected to the connection detection terminal 203, a signal input from the connection detection terminal 203 to the charging control unit 206 is at the high level. When the signal input from the connection detection terminal 203 to the charging control unit 206 is at the high level, the charging control unit 206 determines that the battery pack 100 is connected to the charging apparatus 200. If the charging control unit 206 determines that the battery pack 100 is connected to the charging apparatus 200 (YES in step S601), the flowchart proceeds from step S601 to step S602.

If the connection detection terminal 103 is not connected to the connection detection terminal 203, a signal input from the connection detection terminal 203 to the charging control unit 206 is at the low level. When the signal input from the connection detection terminal 203 to the charging control unit 206 is at the low level, the charging control unit 206 determines that the battery pack 100 is not connected to the charging apparatus 200. If the charging control unit 206 determines that the battery pack 100 is not connected to the charging apparatus 200 (NO in step S601), the flowchart proceeds from step S601 to step S601.

In step S602, the charging control unit 206 turns off the SW 208b. After the charging control unit 206 turns off the SW 208b, the flowchart proceeds from step S602 to step S603.

In step S603, the communication control unit 209 detects the voltage level of the input signal from the communication line L1 within the predetermined time T1, and notifies the charging control unit 206 of the detected voltage level.

If the voltage level detected by the communication control unit 209 within the predetermined time T1 is the high level (HIGH in step S603), the flowchart proceeds from step S603 to step S604. If the voltage level detected by the communication control unit 209 within the predetermined time T1 is the low level (LOW in step S603), the flowchart proceeds from step S603 to step S605.

In step S604, the charging control unit 206 instructs the state notification unit 207 to perform a notification of the loose connection (case D). As a consequence, the state notification unit 207 can notify the user of the loose connection with use of at least one of a message, light, and sound. After instructing the state notification unit 207 to notify the user of the loose connection, the flowchart ends.

In step S605, the charging control unit 206 determines whether or not the predetermined time T1 has elapsed after the SW 208b is turned off in step S602. If the predetermined time T1 has elapsed (YES in step S605), the flowchart proceeds from step S605 to step S606. If the predetermined time T1 has not elapsed (NO in step S605), the flowchart proceeds from step S605 to step S605.

In step S606, the charging control unit 206 turns on the SW 208b. After the charging control unit 206 turns on the SW 208b, the flowchart proceeds from step S606 to step S607.

In step S607, the communication control unit 209 detects the voltage level of the input signal from the communication line L1 within the predetermined time T2, and notifies the charging control unit 206 of the detected voltage level.

If the voltage level detected by the communication control unit 209 within the predetermined time T2 is the high level (HIGH in step S607), the flowchart proceeds from step S607 to step S608. If the voltage level detected by the communication control unit 209 within the predetermined time T2 is the low level (LOW in step S607), the flowchart proceeds from step S607 to step S610.

In step S608, the charging control unit 206 instructs the charging unit 205 to start charging (case B). As a consequence, the charging unit 205 starts charging the battery pack 100. After the charging control unit 206 instructs the charging unit 205 to start charging, the flowchart proceeds from step S608 to step S609.

In step S609, the charging control unit 206 determines whether or not the predetermined time T2 has elapsed after the SW 208b is turned on in step S606. The predetermined time T2 may be the same as the predetermined time T1 or may be different from the predetermined time T1.

If the predetermined time T2 has elapsed (YES in step S609), the flowchart proceeds from step S609 in FIG. 6 to step S612 in FIG. 7. If the predetermined time T2 has not elapsed (NO in step S609), the flowchart proceeds from step S609 to step S609.

In step S610, the charging control unit 206 instructs the charging unit 205 to continue to stop charging (case A). As a consequence, the charging unit 205 continues to stop charging the battery pack 100. After the charging control unit 206 instructs the charging unit 205 to continue to stop charging, the flowchart proceeds from step S610 to step S611.

In step S611, the charging control unit 206 determines whether or not the predetermined time T2 has elapsed after the SW 208b is turned on in step S606. If the predetermined time T2 has elapsed (YES in step S611), the flowchart proceeds from step S611 in FIG. 6 to step S628 in FIG. 8. If the predetermined time T2 has not elapsed (NO in step S611), the flowchart proceeds from step S611 to step S611.

In step S612 in FIG. 7, the charging control unit 206 turns off the SW 208b. After the charging control unit 206 turns off the SW 208b, the flowchart proceeds from step S612 to step S613.

In step S613, the communication control unit 209 detects the voltage level of the input signal from the communication line L1 within the predetermined time T1, and notifies the charging control unit 206 of the detected voltage level.

If the voltage level detected by the communication control unit 209 within the predetermined time T1 is the high level (HIGH in step S613), the flowchart proceeds from step S613 to step S623. If the voltage level detected by the communication control unit 209 within the predetermined time T1 is the low level (LOW in step S613), the flowchart proceeds from step S613 to step S614.

In step S614, the charging control unit 206 determines whether or not the predetermined time T1 has elapsed after the SW 208b is turned off in step S612. If the predetermined time T1 has elapsed (YES in step S614), the flowchart proceeds from step S614 to step S615. If the predetermined time T1 has not elapsed (NO in step S614), the flowchart proceeds from step S614 to step S614.

In step S615, the charging control unit 206 turns on the SW 208b. After the charging control unit 206 turns on the SW 208b, the flowchart proceeds from step S615 to step S616.

In step S616, the communication control unit 209 detects the voltage level of the input signal from the communication line L1 within the predetermined time T2, and notifies the charging control unit 206 of the detected voltage level. If the voltage level detected by the communication control unit 209 within the predetermined time T2 is the high level (HIGH in step S616), the flowchart proceeds step S616 to step S617. If the voltage level detected by the communication control unit 209 within the predetermined time T2 is the low level (LOW in step S616), the flowchart proceeds from step S616 to step S621.

In step S617, the charging control unit 206 instructs the charging unit 205 to continue the charging (case B). As a consequence, the charging unit 205 continues the charging of the battery pack 100. After the charging control unit 206 instructs the charging unit 205 to continue the charging, the flowchart proceeds from step S617 to step S618.

In step S618, the charging control unit 206 determines whether or not the charging of the battery pack 100 by the charging unit 205 ends. If the charging of the battery pack 100 by the charging unit 205 ends (YES in step S618), the flowchart proceeds from step S618 to step S619. If the charging of the battery pack 100 by the charging unit 205 does not end (NO in step S618), the flowchart proceeds from step S618 to step S620.

In step S619, the charging control unit 206 instructs the state notification unit 207 to perform a notification of the end of charging. As a consequence, the state notification unit 207 can notify the user of the end of charging the battery pack 100 with use of at least one of a message, light, and sound. After instructing the state notification unit 207 to notify the user of the end of charging, the flowchart ends.

In step S620, the charging control unit 206 determines whether or not the predetermined time T2 has elapsed after the SW 208b is turned on in step S615. If the predetermined time T2 has elapsed (YES in step S620), the flowchart returns from step S620 to step S612. If the predetermined time T2 has not elapsed (NO in step S620), the flowchart proceeds from step S620 to step S620.

In step S621, the charging control unit 206 instructs the charging unit 205 to stop charging (case A). As a consequence, the charging unit 205 stops charging the battery pack 100. After the charging control unit 206 instructs the charging unit 205 to stop charging, the flowchart proceeds from step S621 to step S622.

In step S622, the charging control unit 206 determines whether or not the predetermined time T2 has elapsed after the SW 208b is turned on in step S615. If the predetermined time T2 has elapsed (YES in step S622), the flowchart proceeds from step S622 in FIG. 7 to step S628 in FIG. 8. If the predetermined time T2 has not elapsed (NO in step S622), the flowchart proceeds from step S622 to step S622.

In step S623, the charging control unit 206 determines whether or not the predetermined time T1 has elapsed after the SW 208b is turned off in step S612. If the predetermined time T1 has elapsed (YES in step S623), the flowchart proceeds from step S623 to step S624. If the predetermined time T1 has not elapsed (NO in step S623), the flowchart proceeds from step S623 to step S623.

In step S624, the charging control unit 206 turns on the SW 208b. After the charging control unit 206 turns on the SW 208b, the flowchart proceeds from step S624 to step S625.

In step S625, the communication control unit 209 detects the voltage level of the input signal from the communication line L1 within the predetermined time T2, and notifies the charging control unit 206 of the detected voltage level. If the voltage level detected by the communication control unit 209 within the predetermined time T2 is the high level (HIGH in step S625), the flowchart proceeds from step S625 to step S626. If the voltage level detected by the communication control unit 209 within the predetermined time T2 is the low level (LOW in step S625), the flowchart proceeds from step S625 to step S627.

In step S626, the charging control unit 206 instructs the state notification unit 207 to perform a notification of the loose connection and further instructs the charging unit 205 to stop charging (case D). As a consequence, the state notification unit 207 can notify the user of the loose connection with use of at least one of a message, light, and sound. The charging unit 205 stops charging the battery pack 100. After instructing the state notification unit 207 to perform the notification of the loose connection and further instructing the charging unit 205 to stop charging, the flowchart ends.

In step S627, the charging control unit 206 determines whether or not the predetermined time T2 has elapsed after the SW 208b is turned on in step S624. If the predetermined time T2 has elapsed (YES in step S627), the flowchart returns from step S627 to step S612. If the predetermined time T2 has not elapsed (NO in step S627), the flowchart proceeds from step S627 to step S627.

In step S628 in FIG. 8, the charging control unit 206 turns off the SW 208b. After the charging control unit 206 turns off the SW 208b, the flowchart proceeds from step S628 to step S629.

In step S629, the communication control unit 209 detects the voltage level of the input signal from the communication line L1 within the predetermined time T1, and notifies the charging control unit 206 of the detected voltage level. If the voltage level detected by the communication control unit 209 within the predetermined time T1 is the high level (HIGH in step S629), the flowchart proceeds from step S629 to step S641. If the voltage level detected by the communication control unit 209 within the predetermined time T1 is the low level (LOW in step S629), the flowchart proceeds from step S629 to step S630.

In step S630, the charging control unit 206 determines whether or not the predetermined time T1 has elapsed after the SW 208b is turned off in step S628. If the predetermined time T1 has elapsed (YES in step S630), the flowchart proceeds from step S630 to step S631. If the predetermined time T1 has not elapsed (NO in step S630), the flowchart proceeds from step S630 to step S630.

In step S631, the charging control unit 206 turns on the SW 208b. After the charging control unit 206 turns on the SW 208b, the flowchart proceeds from step S631 to step S632.

In step S632, the communication control unit 209 detects the voltage level of the input signal from the communication line L1 within the predetermined time T2, and notifies the charging control unit 206 of the detected voltage level. If the voltage level detected by the communication control unit 209 within the predetermined time T2 is the high level (HIGH in step S632), the flowchart proceeds from step S632 to step S639. If the voltage level detected by the communication control unit 209 within the predetermined time T2 is the low level (LOW in step S632), the flowchart proceeds from step S632 to step S633.

In step S633, the charging control unit 206 instructs the charging unit 205 to continue to stop charging (case A). As a consequence, the charging unit 205 continues to stop charging the battery pack 100. After the charging control unit 206 instructs the charging unit 205 to continue to stop charging, the flowchart proceeds from step S633 to step S634.

In step S634, the communication control unit 209 determines whether or not the predetermined time T3 has elapsed after the charging of the battery pack 100 is stopped. If the predetermined time T3 has elapsed (YES in step S634), the flowchart proceeds from step S634 to step S635. If the predetermined time T3 has not elapsed (NO in step S634), the flowchart proceeds from step S634 to step S638.

In step S635, the charging control unit 206 determines whether or not a charging voltage to the battery pack 100 is less than a predetermined voltage Vn. The charging voltage to the battery pack 100 is detected by the charging unit 205, and is notified from the charging unit 205 to the charging control unit 206.

If the charging voltage to the battery pack 100 is less than the predetermined voltage Vn, the charging control unit 206 determines that the battery pack 100 is in an abnormal state and the battery pack 100 is an abnormal battery. If the charging voltage to the battery pack 100 is less than the predetermined voltage Vn (YES in step S635), then, the flowchart proceeds from step S635 to step S636. If the charging voltage to the battery pack 100 is not less than the predetermined voltage Vn (NO in step S635), the flowchart proceeds from step S635 to step S637.

In step S636, the charging control unit 206 instructs the state notification unit 207 to perform a notification of the abnormal battery (case C). As a consequence, the state notification unit 207 can notify the user that the battery pack 100 is the abnormal battery with use of at least one of a message, light, and sound. After instructing the state notification unit 207 to notify the user of the abnormal battery, the flowchart ends.

In step S637, the charging control unit 206 instructs the state notification unit 207 to perform a notification of the end of charging. As a consequence, the state notification unit 207 can notify the user of the charging end of the battery pack 100 with use of at least one of a message, light and sound. After instructing the state notification unit 207 to notify the user of the end of the charging, the flowchart ends.

In step S638, the charging control unit 206 determines whether or not the predetermined time T2 has elapsed after the SW 208b is turned on in step S631. If the predetermined time T2 has elapsed (YES in step S638), the flowchart returns from step S638 to step S628. If the predetermined time T2 has not elapsed (NO in step S638), the flowchart proceeds from step S638 to step S638.

In step S639, the charging control unit 206 instructs the charging unit 205 to start charging (case B). As a consequence, the charging unit 205 starts charging the battery pack 100. After the charging control unit 206 instructs the charging unit 205 to start charging, the flowchart proceeds from step S639 to step S640.

In step S640, the charging control unit 206 determines whether or not the predetermined time T2 has elapsed after the SW 208b is turned on in step S631. If the predetermined time T2 has elapsed (YES in step S640), the flowchart returns from step S640 in FIG. 8 to step S612 in FIG. 7. If the predetermined time T2 has not elapsed (NO in step S640), the flowchart proceeds from step S640 to step S640.

In step S641, the charging control unit 206 determines whether or not the predetermined time T1 has elapsed after the SW 208b is turned off in step S628. If the predetermined time T1 has elapsed (YES in step S641), the flowchart proceeds from step S641 to step S642. If the predetermined time T1 has not elapsed (NO in step S641), the flowchart proceeds from step S641 to step S641.

In step S642, the charging control unit 206 turns on the SW 208b. After the charging control unit 206 turns on the SW 208b, the flowchart proceeds from step S642 to step S643.

In step S643, the communication control unit 209 detects the voltage level of the input signal from the communication line L1 within the predetermined time T2, and notifies the charging control unit 206 of the detected voltage level. If the voltage level detected by the communication control unit 209 within the predetermined time T2 is the high level (HIGH in step S643), the flowchart proceeds from step S643 to step S644. If the voltage level detected by the communication control unit 209 within the predetermined time T2 is the low level (LOW in step S643), the flowchart proceeds from step S643 to step S645.

In step S644, the charging control unit 206 instructs the state notification unit 207 to perform a notification of the loose connection (case D). As a consequence, the state notification unit 207 can notify the user of the loose connection with use of at least one of a message, light, and sound. After instructing the state notification unit 207 to notify the user of the loose connection, the flowchart ends.

In step S645, the charging control unit 206 determines whether or not the predetermined time T2 has elapsed after the SW 208b is turned on in step S642. If the predetermined time T2 has elapsed (YES in step S645), the flowchart returns from step S645 to step S628. If the predetermined time T2 has not elapsed (NO in step S645), the flowchart proceeds from step S645 to step S645.

Second Exemplary Embodiment

Various functions and processes according to the first exemplary embodiment can be realized by a personal computer, a microcomputer, or a central processing unit (CPU) executing a program. According to a second exemplary embodiment of the present invention, the personal computer, the microcomputer, and the CPU are referred to as a "computer". According to the second exemplary embodiment, a program for controlling the computer and realizing various functions and processes according to the first exemplary embodiment is referred to as a "predetermined program".

The computer executes the predetermined program to realize the various functions and processes according to the first exemplary embodiment. In this case, the predetermined program can be supplied to the computer via a computer-readable recording medium. According to the second exemplary embodiment, a computer-readable recording medium may include at least one of a hard disk device, an optical disk, a compact disc read only memory (CD-ROM), a compact disc recordable (CD-R), a memory card, a read only memory (ROM), and a random access memory (RAM). According to the second exemplary embodiment, the computer-readable recording medium is a non-transitory recording medium.

While the present invention has been described with reference to the disclosed exemplary embodiments, it is to be understood that the present invention is not limited to the disclosed exemplary embodiments. The scope of the following claims is to be accorded the broadest interpretation so as to encompass all modifications and equivalent structures.

This application claims priority from Japanese Patent Application No. 2011-023667 filed Feb. 7, 2011, which is hereby incorporated by reference herein in its entirety.

What is claimed is:

1. A charging apparatus comprising:
   a first communication terminal configured to connect with a second communication terminal of a battery device including two or more battery cells, and configured to receive a signal for controlling charging of the battery device from the battery device via the second communication terminal;
   a detection unit configured to detect a voltage level of an input signal input in the charging apparatus from the battery device via the first communication terminal and the second communication terminal;
   a signal switching unit configured to connect between the first communication terminal and the detection unit, and configured to change the voltage level of the input signal input in the charging apparatus from the battery device via the first communication terminal and the second communication terminal; and
   a charging control unit configured to use a first detected voltage level which is detected by the detection unit before the signal switching unit changes the voltage level of the input signal and a second detected voltage level which is detected by the detection unit after the signal switching unit changes the voltage level of the input signal to control charging of the battery device.

2. The charging apparatus according to claim 1, wherein the charging apparatus (a) receives a first charging control signal for instructing the charging apparatus to stop charging of the battery device from the battery device via the first communication terminal and the second communication terminal if a voltage of one or more battery cells included in the battery device are equal to or more than a predetermined voltage, and (b) receives a second charging control signal for instructing the charging apparatus to start charging of the battery device from the battery device via the first communication terminal and the second communication terminal if voltages of all of the two or more battery cells included in the battery device are less than the predetermined voltage.

3. The charging apparatus according to claim 1, wherein the two or more battery cells included in the battery device are serially connected.

4. The charging apparatus according to claim 1, wherein the battery device is used as a battery pack.

5. The charging apparatus according to claim 1, wherein the two or more battery cells includes a lithium ion battery.

6. The charging apparatus according to claim 1, wherein the charging control unit (a) uses the first detected voltage level which is detected by the detection unit before the signal switching unit changes the voltage level of the input signal and the second detected voltage level which is detected by the detection unit after the signal switching unit changes the voltage level of the input signal to determine whether a communication line formed by the first communication terminal and the second communication terminal is short-circuited, and (b) stops charging of the battery device if the communication line formed by the first communication terminal and the second communication terminal is short-circuited.

7. The charging apparatus according to claim 1, wherein the charging control unit (a) uses the first detected voltage level which is detected by the detection unit before the signal switching unit changes the voltage level of the input signal and the second detected voltage level which is detected by the detection unit after the signal switching unit changes the voltage level of the input signal to determine whether a loose connection occurs between the first communication terminal and the second communication terminal, and (b) stops charging of the battery device if the loose connection occurs between the first communication terminal and the second communication terminal.

8. The charging apparatus according to claim 1, further comprising a terminal that is used to determine whether the battery device is connected to the charging apparatus.

9. A method comprising:
receiving a signal for controlling charging of a battery device including two or more battery cells from the battery device via a first communication terminal of a charging apparatus and a second communication terminal of the battery device, wherein the first communication terminal is configured to connect with the second communication terminal;
causing a detection unit of the charging apparatus to detect a voltage level of an input signal input in the charging apparatus from the battery device via the first communication terminal and the second communication terminal;
causing a signal switching unit of the charging apparatus to change the voltage level of the input signal input in the charging apparatus from the battery device via the first communication terminal and the second communication terminal, wherein the signal switching unit is configured to connect between the first communication terminal and the detection unit; and
using a first detected voltage level which is detected by the detection unit before the signal switching unit changes the voltage level of the input signal and a second detected voltage level which is detected by the detection unit after the signal switching unit changes the voltage level of the input signal to control charging of the battery device.

10. The method according to claim 9, further comprising:
receiving a first charging control signal for instructing the charging apparatus to stop charging of the battery device from the battery device via the first communication terminal and the second communication terminal if a voltage of one or more battery cells included in the battery device are equal to or more than a predetermined voltage; and
receiving a second charging control signal for instructing the charging apparatus to start charging of the battery device from the battery device via the first communication terminal and the second communication terminal if voltages of all of the two or more battery cells included in the battery device are less than the predetermined voltage.

11. The method according to claim 9, wherein the two or more battery cells included in the battery device are serially connected.

12. The method according to claim 9, wherein the battery device is used as a battery pack.

13. The method according to claim 9, wherein the two or more battery cells includes a lithium ion battery.

14. The method according to claim 9, further comprising:
using the first detected voltage level which is detected by the detection unit before the signal switching unit changes the voltage level of the input signal and the second detected voltage level which is detected by the detection unit after the signal switching unit changes the voltage level of the input signal to determine whether a communication line formed by the first communication terminal and the second communication terminal is short-circuited; and
stopping charging of the battery device if the communication line formed by the first communication terminal and the second communication terminal is short-circuited.

15. The method according to claim 9, further comprising:
using the first detected voltage level which is detected by the detection unit before the signal switching unit changes the voltage level of the input signal and the second detected voltage level which is detected by the detection unit after the signal switching unit changes the voltage level of the input signal to determine whether a loose connection occurs between the first communication terminal and the second communication terminal; and
stopping charging of the battery device if the loose connection occurs between the first communication terminal and the second communication terminal.

16. The method according to claim 9, further comprising using a terminal of the charging apparatus to determine whether the battery device is connected to the charging apparatus.

17. A non-transitory computer readable storage medium that stores a program for causing a computer to execute a method, the method comprising:
receiving a signal for controlling charging of a battery device including two or more battery cells from the battery device via a first communication terminal of a charging apparatus and a second communication terminal of the battery device, wherein the first communication terminal is configured to connect with the second communication terminal;
causing a detection unit of the charging apparatus to detect a voltage level of an input signal input in the charging apparatus from the battery device via the first communication terminal and the second communication terminal;
causing a signal switching unit of the charging apparatus to change the voltage level of the input signal input in the charging apparatus from the battery device via the first communication terminal and the second communication terminal, wherein the signal switching unit is configured to connect between the first communication terminal and the detection unit; and
using a first detected voltage level which is detected by the detection unit before the signal switching unit changes the voltage level of the input signal and a second detected voltage level which is detected by the detection unit after the signal switching unit changes the voltage level of the input signal to control charging of the battery device.

* * * * *